(12) United States Patent
Mirabella et al.

(10) Patent No.: US 10,019,474 B2
(45) Date of Patent: Jul. 10, 2018

(54) AUTOMATIC RANKING OF DESIGN PARAMETER SIGNIFICANCE FOR FAST AND ACCURATE CAE-BASED DESIGN SPACE EXPLORATION USING PARAMETER SENSITIVITY FEEDBACK

(71) Applicant: Siemens Aktiengesellschaft, Munich (DE)

(72) Inventors: Lucia Mirabella, Plainsboro, NJ (US); Sanjeev Srivastava, Princeton, NJ (US); Erhan Arisoy, Pittsburgh, PA (US); Suraj Ravi Musuvathy, Glenmont, NY (US)

(73) Assignee: Siemens Aktiengesellschaft, Munich (DE)

( * ) Notice: Subject to any disclaimer, the term of this patent is extended or adjusted under 35 U.S.C. 154(b) by 410 days.

(21) Appl. No.: 14/957,755

(22) Filed: Dec. 3, 2015

(65) Prior Publication Data
US 2016/0171134 A1 Jun. 16, 2016

Related U.S. Application Data

(60) Provisional application No. 62/090,412, filed on Dec. 11, 2014.

(51) Int. Cl.
*G06F 17/50* (2006.01)
*G06F 17/30* (2006.01)

(52) U.S. Cl.
CPC ........ *G06F 17/30345* (2013.01); *G06F 17/50* (2013.01); *G06F 2217/10* (2013.01)

(58) Field of Classification Search
CPC ................................. G06F 17/30345
USPC .............................................. 703/1
See application file for complete search history.

(56) References Cited

U.S. PATENT DOCUMENTS

| | | | | |
|---|---|---|---|---|
| 5,953,517 A | * | 9/1999 | Yin | G06F 17/509 716/122 |
| 2003/0046049 A1 | * | 3/2003 | Chatfield | F02D 41/1406 703/6 |
| 2010/0004769 A1 | * | 1/2010 | Holden | G06F 17/5086 700/97 |

(Continued)

*Primary Examiner* — Timothy A Mudrick

(57) ABSTRACT

A computer-implemented method for ranking design parameter significance includes a computer receiving an input dataset representative of a physical object. This input dataset includes a baseline parameters and associated probabilities. The computer also receives performance requirements. For each respective baseline parameter, the computer performs an analysis process. During this analysis process, a range of parameter values are selected for the respective baseline parameter based on its corresponding probability distribution. The range of parameter values are segmented into parameter subsets and multiple instances of a simulation are executed using the performance requirements to yield snapshots. A Proper Orthogonal Decomposition (POD) basis is derived using the snapshots. A sensitivity analysis is performed based on the POD basis to yield a sensitivity measurement representative of an effect of variation of the respective parameter on the performance requirements. The computer may then generate a ranking of the baseline parameters according to their corresponding sensitivity measurements.

20 Claims, 3 Drawing Sheets

(56) References Cited

U.S. PATENT DOCUMENTS

2010/0250205 A1\* 9/2010 Velazquez Lopez ............... G06F 17/5018
　　　　　　　　　　　　　　　　　　703/2

\* cited by examiner

AUTOMATIC RANKING OF DESIGN PARAMETER SIGNIFICANCE FOR FAST AND ACCURATE CAE-BASED DESIGN SPACE EXPLORATION USING PARAMETER SENSITIVITY FEEDBACK

CROSS-REFERENCE TO RELATED APPLICATIONS

This application claims priority to U.S. provisional application Ser. No. 62/090,412 filed Dec. 11, 2015, which is incorporated herein by reference in its entirety.

TECHNICAL FIELD

The present invention relates generally to methods, systems, and apparatuses for the automatic ranking of design parameter significance for fast and accurate Computer-aided Engineering (CAE)-based design space exploration using parameter sensitivity feedback. The disclosed techniques may be applied, for example, to facilitate the selection of optimal design parameters for products subject to complex physical models.

BACKGROUND

Design space exploration using Computer-aided Engineering (CAE) analyses greatly benefits industrial product development. This is typically an iterative process involving a designer varying a set of parameters, and ultimately converging to an optimal set that achieves good expected functional characteristics as reported by the CAE analyses. However, the extent of CAE-based design exploration is currently limited due to the fact that products (such as aircrafts) are typically defined by a large number of design parameters, and computing CAE responses for a single set is a time consuming process thereby prohibiting the use of CAE for a large set of design variations.

Computational Fluid Dynamics (CFD) is an example of a tool employed in the iterative CAE process. CFD uses numerical methods and algorithms to solve and analyze problems that involve fluid flows. Performing CFD simulations is a time-consuming and performance-intensive activity. Additionally, CFD model preparation (including preparation of CFD mesh) is a very time-consuming and highly operator dependent task, often constituting the bottle neck of the process. This is often the result of tedious geometry cleanup and preparation, and challenges associated with obtaining a closed fluid volume. Repeating this process for each possible variation of a geometrical model becomes very computationally expensive. Thus, it would be valuable to have a reliable method to automatically identify the points in the parameter space that need to be analyzed in detail.

To date, the most direct and computationally expensive approach to evaluate design variations of a computer aided design (CAD) model is the generation of a detailed computational model and CFD simulation for several variations of all the considered parameters. This approach, if performed with a fine granularity of the design parameter-space sweep, heuristically allows the selection of a good approximation of the optimal design to achieve the desired technical performance. However, the realization of this approach becomes intractable in real applications. To address this issue, generally in practice, coarse granularity of parameter space is chosen. In addition, designers/engineers use their experience and comparison with past cases to manually reduce the features to explore. Often, in combination with this, approaches to reduce the computational cost of each CFD simulations are also implemented. This includes the use of high-performance computing, the use of reduced order modeling, and the combined use of reduced-order and full-order CFD simulation techniques.

SUMMARY

Embodiments of the present invention address and overcome one or more of the above shortcomings and drawbacks, by providing methods, systems, and apparatuses related to the automatic ranking of design parameter significance, for fast and accurate CAE-based design space exploration, using parameter sensitivity feedback. Briefly, the technology described herein utilizes model reduction techniques to analyze high-dimensional dynamical systems using lower-dimensional approximations, which reproduces the characteristic dynamics of the system. Using these approximations, an understanding of the effects of different parameters on design requirements can be developed while minimizing computational cost and storage requirements. Parameters may then be ranked as highly significant if a metric (or combination of metrics) of interest is highly sensitive to that parameter.

According to some embodiments, a computer-implemented method for ranking design parameter significance includes a computer receiving an input dataset representative of a physical object, wherein the input dataset comprises a plurality of baseline parameters and a probability for each of the plurality of baseline parameters. The computer also receives one or more performance requirements. In some embodiments, the input dataset comprises a geometry dataset representative of the physical object (e.g., a Computer Aided Design (CAD) dataset). In one embodiment, the geometry dataset comprises a realization of the physical object and the probability distribution for each parameter is determined based on an analysis of pre-existing alternative realizations of the physical object. The probability distribution for each parameter may be defined, for example, a priori, based on one or more characteristics of the plurality of baseline parameters. In some embodiments, the input dataset may include one or more non-geometric datasets related to the physical object.

Continuing with reference to the method for ranking design parameter significance, after receiving the input dataset, the computer performs an analysis process for each respective baseline parameter included in the plurality of baseline parameters. During this analysis process, a range of parameter values are selected for the respective baseline parameter based on its corresponding probability distribution. The range of parameter values are segmented into a plurality of parameter subsets based on a pre-determined granularity for the respective parameter. A plurality of instances of a simulation is executed using the one or more performance requirements to yield a plurality of snapshots, wherein each respective instance corresponds to one of the plurality of parameter subsets. Next, a Proper Orthogonal Decomposition (POD) basis is derived on the plurality of snapshots. A sensitivity analysis may then be performed based on the POD basis to yield a sensitivity measurement representative of an effect of variation of the respective parameter on the one or more performance requirements. In some embodiments, the extent of deviation of the respective parameter from its corresponding baseline parameter value is determined during the analysis process. If the extent of deviation is greater than a predetermined threshold value, the pre-determined granularity for the respective parameter is reduced and the analysis process is repeated for the respective parameter. Once the analysis process is complete, the computer may then generate a ranking of the plurality of baseline parameters according to their corresponding sensitivity measurements. In some embodiments, a threshold is applied to the ranking of the plurality of baseline parameters to identify a plurality of highest ranking parameters.

According to other embodiments, an article of manufacture for ranking design parameter significance includes a non-transitory, tangible computer-readable medium holding computer-executable instructions for performing the aforementioned method, with or without the additional features set forth above.

According to other embodiments, a system for ranking design parameter significance includes an input module, a simulation module, a model reduction module, a sensitivity module, and a ranking module. The input module is configured to determine a probability for each of a plurality of baseline parameters included in an input dataset representative of a physical object. The simulation module is configured to perform an analysis process for each respective baseline parameter included in the plurality of baseline parameters. This analysis process includes selecting a range of parameter values for the respective baseline parameter based on its corresponding probability distribution, segmenting the range of parameter values into a plurality of parameter subsets based on a pre-determined granularity for the respective parameter, and running a plurality of instances of a simulation using one or more performance requirements associated with the physical object to yield a plurality of snapshots. The model reduction module is configured to derive a plurality of POD bases using snapshots generated by the simulation module. The sensitivity module is configured to perform a sensitivity analysis based on the POD basis to yield a sensitivity measurement for each respective baseline parameter included in the plurality of baseline parameters. Each respective sensitivity measurement is representative of an effect of variation of the respective baseline parameter on the one or more performance requirements. Finally, the ranking module is configured to generate a ranking of the plurality of baseline parameters according to their corresponding sensitivity measurements. In some embodiments, the system further includes a parallel computing architecture comprising a plurality of processors configured to execute the plurality of instances of the simulation in parallel.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to the automatic ranking of design parameter significance for the exploration of CAE-based design spaces using parameter sensitivity feedback. For example, in some embodiments of the present invention, techniques are used to reduce the computational cost of parametric design analysis by taking into account the probability distribution of the given variations in the design parameters, and the impact of these variations on the considered performance metrics. Similar techniques can be applied to quantify the effect of inherent uncertainty on features (e.g., geometrical features, boundary conditions, etc.) on the performance metrics. For example, techniques described herein may be used to address the effect of manufacturing defects on design requirements.

Figure 1:
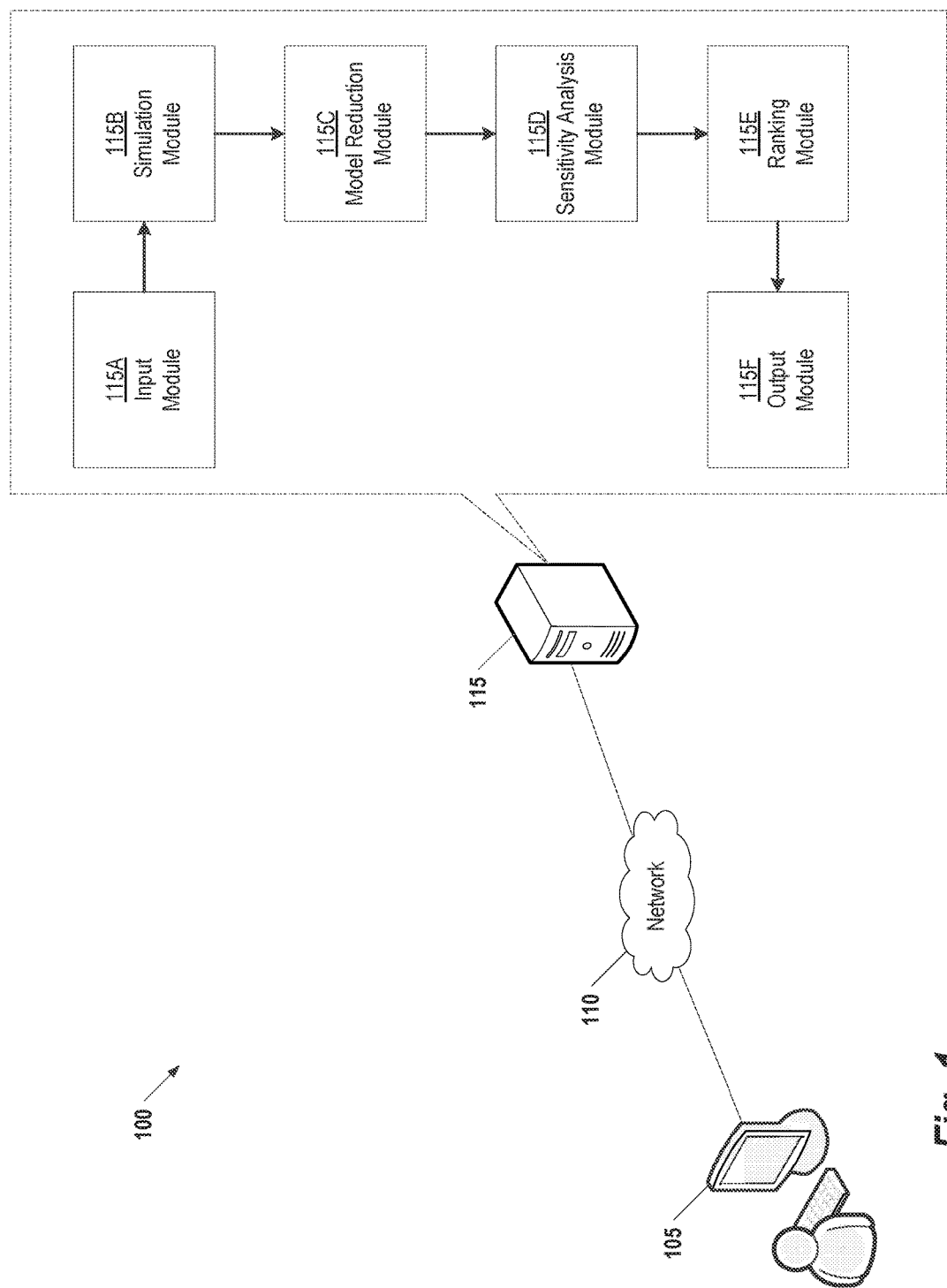
FIG. 1 provides an overview of a system that a user may apply in some embodiments to analyze and rank a plurality of parameters based on the effect of their variation on design metrics.

FIG. 1 provides an overview of a system 100 that a user may apply in some embodiments to analyze and rank a plurality of parameters based on the effect of their variation on design metrics. The user may be, for example, a design engineer analyzing a design of a complex physical device such as an aircraft wing. Such a device may have millions, if not billions, of different design parameters. Thus, as an initial task, the user must determine which parameters have the most impact on system performance. In this way, the user can determine which parameters to focus resources on for additional analysis.

To analyze the parameter space, the User Computer 105 connects to a Parameter Selection Computer 115 via a Network 110. The Network 110 can generally be any computer network generally known in the art. Thus, in some embodiments, the User Computer 105 connects over a wired or wireless local area network to the Parameter Selection Computer 115. In other embodiments, the Parameter Selection Computer 115 may be implemented in a location remote form the location of the User Computer 105. For example, the Parameter Selection Computer 115 can be implemented using a "cloud computing" architecture model which allows the User Computer 105 to connect via the Internet.

Various interfaces may be used to facilitate the communications between the User Computer 105 and the Parameter Selection Computer 115. For example, in some embodiments the Parameter Selection Computer supports a web application which displays a graphical user interface (GUI) in a webpage on the User Computer 105. The User can then interact with the Parameter Selection Computer 115. In other embodiments, the Parameter Selection Computer 115 may be configured to accept commands via a custom application programming interface (API). Thus, for example, a development tool installed on the User Computer 105 may be configured to use the API in parameter selection.

Parameter Selection Computer 115 provides an automated way of analyzing the design parameter space to identify the parameters that are most relevant to the set of design requirements. The Input Module 115A is configured to receive a computer aided design (CAD) geometry dataset of one realization of product being designed. The received geometry includes a combination of geometric parameters (herein referred to as the "baseline geometry") and a probability distribution for each parameter. The Input Module 115A additionally receives one or more performance metric(s) defining the user's requirements for the design of the physical object. These requirements may be specified, for example, in a data file formatted in any general file format known in the art (e.g., Extensible Markup Language). Examples of performance metrics may be mechanical properties (e.g., deformation in particular areas of the object), electrical (e.g., energy efficiency), or even metrics not directly related to the physical object itself (e.g., cost to manufacture).

Continuing with reference to FIG. 1, a Simulation Module 115B creates a range of values for geometric parameters and runs a simulation for each distinct value of each parameter, according to a predefined distribution. The type of simulation executed by the Simulation Module 115B may vary depending on the physical object being analyzed. For example, for an airplane wing, a CFD simulation may be employed. Additionally, in some embodiments, the Simulation Module 115B is configured to execute multiple simulations. Continuing with the example of the airplane wing, in addition to the CFD simulation, the Simulation Module 115B may execute a simulation of the thermal dynamics of the wing under certain conditions.

Each execution of the simulation by the Simulation Module 115B produces a "snapshot" of the system state. Because the input parameter to the simulation is the only parameter being varied from the baseline geometry, the difference between each snapshot is based only on the difference in the value of the input parameter. Also, note that the number of snapshots will be depending on the sampling rate of the input parameter. Thus, the more granular the sampling, the more snapshots are generated. The Simulation Module 115B aggregates the snapshots to create a matrix representative of the effect of the variation on the parameter value on the system metrics.

The Model Reduction Module 115C builds a reduced order model of the simulation results. The model may be built using any reduced order methodology known in the art. For example, in some embodiments, Proper Orthogonal Decomposition (POD) techniques are employed. As is understood in the art, POD is a model reduction technique that identifies the system mode and the corresponding coefficients for each input sample in a dataset in order to develop a reduced order model representative of the original system. The snapshot matrix is decomposed into a set of basis vectors using POD. The snapshots are projected onto the new basis. Then, system behavior can be predicted from these projected coordinates and the basis vectors. It should be noted that the basis vectors produced by POD are ordered in decreasing order of importance. This allows users to selectively discard lower order modes to reduce model size while maintaining a highly accurate estimate of the original system. The accuracy of the model is generally referred to by the number of modes retained after the discarding process. Thus, a k-order approximation of the system only retains the first k modes.

The Sensitivity Analysis Module 115D performs an analysis of the system, as defined by the POD basis, to determine how sensitive each metric is to variations of the parameter of interest in comparison to its baseline value. There are many techniques of performing a sensitivity analysis generally known in the art and, in principle, these techniques may be applied by the Sensitivity Analysis Module 115D. For example, in some embodiments, analysis is performed on the derivatives of the modes generated by the Model Reduction Module 115C. The output of the sensitivity analysis is a value or a set of values which provides an indication of how sensitive the system is to perturbations of the particular parameter. For example, in some embodiments, a distribution is generated by the sensitivity analysis and the variance of the distribution is used as the sensitivity measurement for that particular parameter. In other embodiments different techniques may be applied to capture the variability information. In addition to the range of variation produced by the given variability of a particular parameter, the Sensitivity Analysis Module 115D may also provide related information such as the trend and extent of deviation from baseline performance metric values for a given deviation of the parameter from the baseline geometry.

The process described above with respect to the Simulation Module 115B and the sensitivity analysis is repeated for each parameter in the parameter space. It should be noted that the granularity of values used for each parameter may be different. For example, based on a priori information, a user may specify that certain parameters are more important than others. The Parameter Selection Computer 115 may then select the values of such parameter for the simulation based on their relative significance. Alternatively, the granularity of the parameter space, for each parameter, can be derived as output of the Sensitivity Analysis Tool, based on the amount of variation that the user wants to detect in the CAE response.

The Ranking Module 115E ranks each parameter based on its sensitivity measurement provided by the Sensitivity Analysis Module 115D. This ranking results in a list of the parameters ordered based on the effect of their variation on the performance metrics.

The Output Module 115F provides the ranked results in a user-readable format. For example, in some embodiments, the Parameter Selection Computer 115 provides the ranked results in a GUI, with or without an indication of the individual ranking of each parameter. In some embodiments, the Output Module 115F allows the user to specify a threshold for the ranked results in order to reduce the parameter space by a given dimension. It should be noted that the output step is optional. For example, in some embodiments, the functionality of the Parameter Selection Computer 115 may be part of a general design tool with additional functionality. The parameter selection process can be, in a sense transparent, from the user. For example, upon beginning a new product design, the tool may automatically analyze the parameter space and direct the user to perform additional analysis on the highest ranked parameters, according to a predefined threshold.

The separation of the User Computer 105 and the Parameter Selection Computer 115, as illustrated in FIG. 1, is one example of how the various systems and techniques described herein may be implemented. In other embodiments, for example, the functionality of the Parameter Selection Computer 115 may be implemented directly in an application installed on the User Computer 105, thus eliminating the need for separate physical device. Additionally, in some embodiments, various components of the system 100 are executed on a parallel computing platform comprising of one or more graphical processing units (GPUs). For example, in one embodiment, a parallel computing platform is configured to execute multiple instances of the simulation in parallel. Any parallel computing platform generally known in the art may be used to facilitate parallel execution and programming models, including the NVIDIA™ Compute Unified Device Architecture (CUDA) may be used to optimize usage of the processing units in simulation computations.

Figure 2:
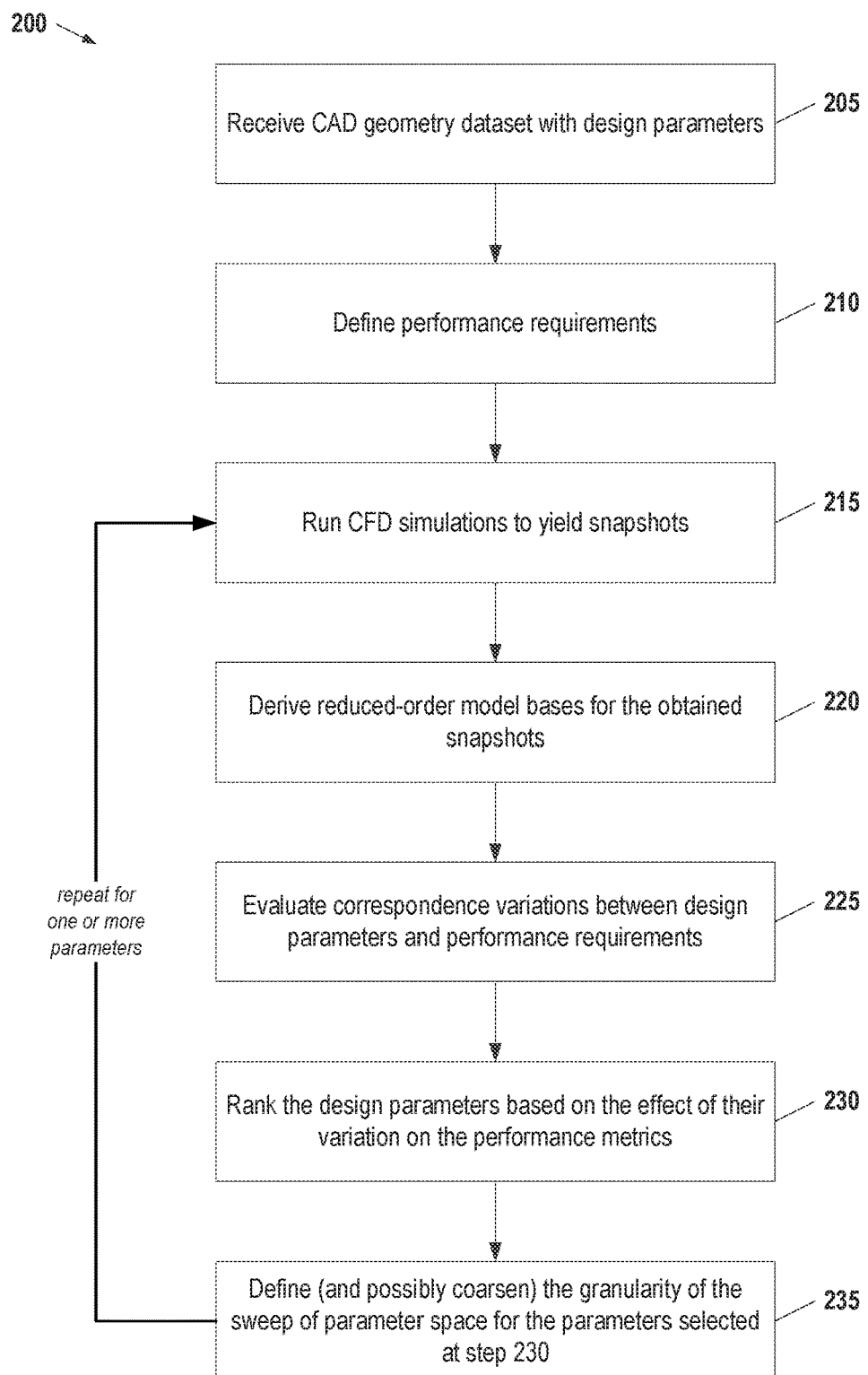
FIG. 2 provides an example of a method for automatically ranking the significance of the design parameters using concepts described above with respect to FIG. 1.

FIG. 2 provides an example of a method 200 for automatically ranking the significance of the design parameters using concepts described above with respect to FIG. 1. Briefly, the method 200 evaluates the design space by two automatic operations. First, the design parameters are ranked according to significance and, secondly, the granularity of the sweep of the multidimensional design parameter space is refined. This approach allows a user to explore design variations of a CAD geometry dataset to be manufactured on the basis of their physical performance. For example, in the context of the design of an aircraft wing, the physical performance may be the response of the wing to external flow surrounding it (e.g., the aerodynamic forces experienced by an aircraft during operation). Additionally, the most relevant design parameters for design analysis may be optimally selected without compromising the accuracy of the analysis.

The example of FIG. 2 illustrates how the method 200 could be applied in the context of an airplane design scenario. The geometric design parameters may include, for example, the width of the wing of the aircraft at the point of attachment with the fuselage, the length of the wing, the position of the engine. However, it should be noted that the general algorithm illustrated in FIG. 2 may be applied to any design content in which a physical property of a geometric model can be analyzed through simulation techniques.

Starting at step 205, a dataset with the CAD geometry of one realization of the airplane is received. The dataset includes a given combination of geometric parameters called baseline geometry, and a probability distribution for each parameter. This probability distribution may be defined, for example, a priori, based on the design space to be explored. Alternatively, the probability distribution may be derived from the analysis of existing realizations of the object (e.g., analyzing the geometry of several CAD models of aircrafts). The number of parameters to explore may be denoted as NP: $P_1 \ldots P_{NP}$. Next, at step 210, one or more performance metrics are defined based on the user's requirements. This number is denoted with NM: $M_1 \ldots M_{NM}$.

Continuing with reference to FIG. 2, at steps 215-225, the variability of the performance metrics in terms of variability of $P_1 \ldots P_{NP}$ is quantified. In the example of FIG. 2, this quantification is achieved by performing a sensitivity analysis based on reduced-order model ("reduced-order sensitivity analysis"), utilizing a technique such as POD. As discussed above with respect to FIG. 1, POD is a conventional data analysis technique which obtains low-dimensional approximate descriptions of high-dimensional processes. At step 215, $N_s$ CFD simulations are separately run for each parameter, including one simulation for the baseline geometry. Each simulation corresponds to a different value of the particular parameter being analyzed and the total number of simulations, $N_s$, will depend on the granularity of how the parameter is sampled. $N_s$ is intended to be significantly smaller than the number of parameter variations needed for a thorough parameter sweep for each parameter $P_i$. Each simulation executed at step 215 results in a snapshot of data. At step 220, these snapshots are used to derive a reduced-order model (e.g., POD) basis. Then, at step 225, reduced-order modeling techniques are used to evaluate ($M_1 \ldots M_{NM}$) in correspondence of the variations on ($P_1 \ldots P_{NP}$) according to their predefined distribution.

For each parameter $P_i$, the process employed by steps 215-225 will produce the range of variation on ($M_1 \ldots M_{NM}$) caused by the given variability in $P_i$. This is used at step 230 to rank the design parameters based on the effect of their variation on the performance metrics. Once ranked, a threshold may be applied to reduce the design space to the most relevant parameters.

Additionally, the process employed by steps 215-225 will produce the trend and extent of deviation from baseline of ($M_1 \ldots M_{NM}$) for a given deviation on $P_i$ from baseline geometry. At step 235, this information is used to redefine (and possibly coarsen) the granularity of the sweep of parameter space for the parameters selected at step 230. In fact, the discretization step of the parameter space sweep of $P_i$ can be larger than the minimum step that produces a significant variation in the performance metrics, where the significance level should be defined by the user, based on the specific application.

The method 200 illustrated in FIG. 2 can be varied in different embodiments. For example, in some embodiments, the parameter space may be refined within a neighborhood of the best performing points in the parameter space. In other embodiments, the reduced-order sensitivity analysis performed at step 225 may be recursively applied by adding snapshots to the POD datasets based on the data generated at step 235.

Figure 3:
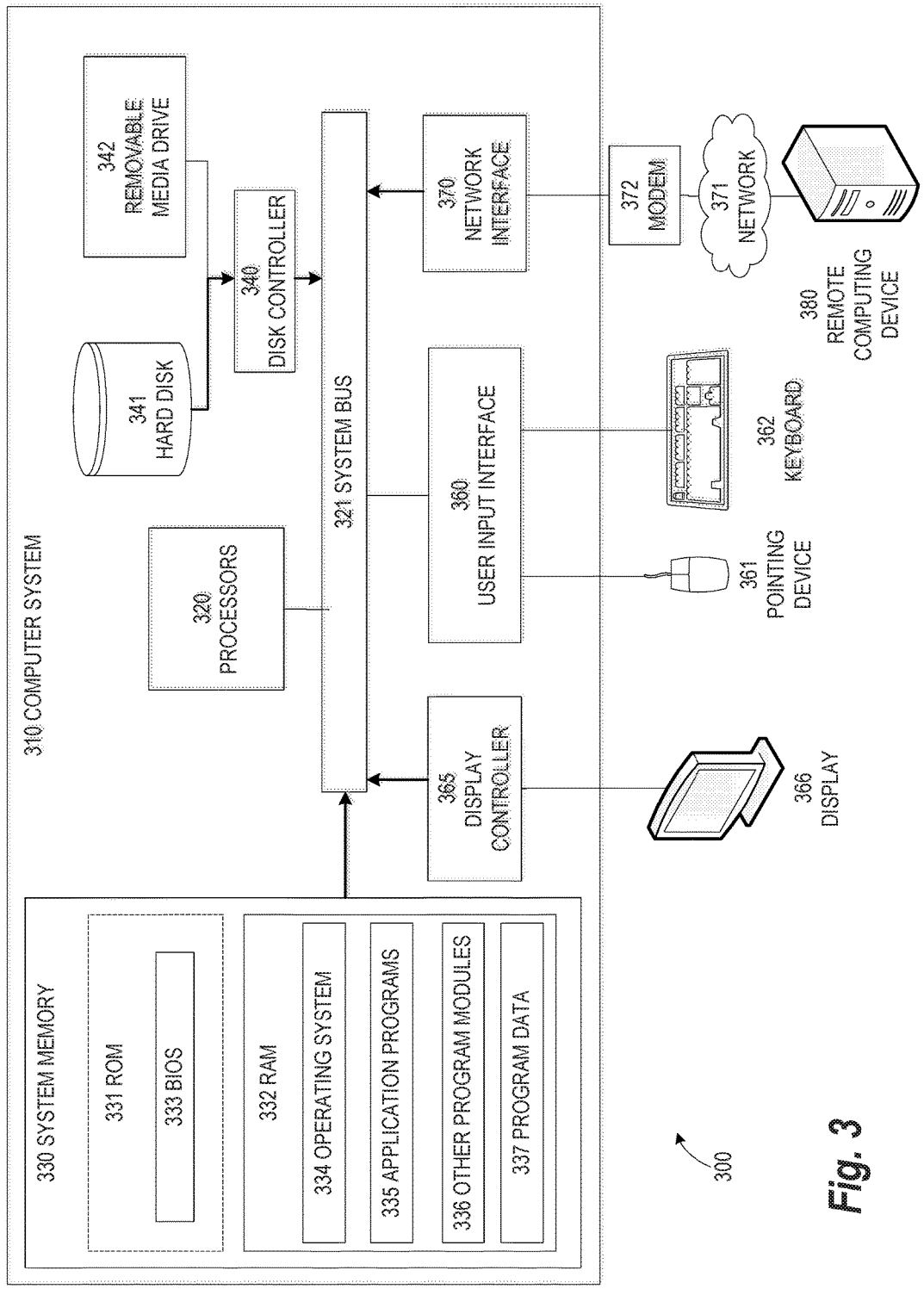
FIG. 3 illustrates an exemplary computing environment within which embodiments of the invention may be implemented.

FIG. 3 illustrates an exemplary computing environment 300 within which embodiments of the invention may be implemented. For example, this computing environment 300 may be used to implement the method 200 described in FIG. 2 as well one or more of the components illustrated in the system 100 of FIG. 1. The computing environment 300 may include computer system 310, which is one example of a computing system upon which embodiments of the invention may be implemented. Computers and computing environments, such as computer system 310 and computing environment 300, are known to those of skill in the art and thus are described briefly herein.

As shown in FIG. 3, the computer system 310 may include a communication mechanism such as a bus 321 or other communication mechanism for communicating information within the computer system 310. The computer system 310 further includes one or more processors 320 coupled with the bus 321 for processing the information. The processors 320 may include one or more central processing units (CPUs), graphical processing units (GPUs), or any other processor known in the art.

The computer system 310 also includes a system memory 330 coupled to the bus 321 for storing information and instructions to be executed by processors 320. The system memory 330 may include computer readable storage media in the form of volatile and/or nonvolatile memory, such as read only memory (ROM) 331 and/or random access memory (RAM) 332. The system memory RAM 332 may include other dynamic storage device(s) (e.g., dynamic RAM, static RAM, and synchronous DRAM). The system memory ROM 331 may include other static storage device(s) (e.g., programmable ROM, erasable PROM, and electrically erasable PROM). In addition, the system memory 330 may be used for storing temporary variables or other intermediate information during the execution of instructions by the processors 320. A basic input/output system (BIOS) 333 containing the basic routines that help to transfer information between elements within computer system 310, such as during start-up, may be stored in ROM 331. RAM 332 may contain data and/or program modules that are immediately accessible to and/or presently being operated on by the processors 320. System memory 330 may additionally include, for example, operating system 334, application programs 335, other program modules 336 and program data 337.

The computer system 310 also includes a disk controller 340 coupled to the bus 321 to control one or more storage devices for storing information and instructions, such as a hard disk 341 and a removable media drive 342 (e.g., floppy disk drive, compact disc drive, tape drive, and/or solid state drive). The storage devices may be added to the computer system 310 using an appropriate device interface (e.g., a small computer system interface (SCSI), integrated device electronics (IDE), Universal Serial Bus (USB), or FireWire).

The computer system 310 may also include a display controller 365 coupled to the bus 321 to control a display 366, such as a cathode ray tube (CRT) or liquid crystal display (LCD), for displaying information to a computer user. The computer system includes an input interface 360 and one or more input devices, such as a keyboard 362 and a pointing device 361, for interacting with a computer user and providing information to the processor 320. The pointing device 361, for example, may be a mouse, a trackball, or a pointing stick for communicating direction information and command selections to the processor 320 and for controlling cursor movement on the display 366. The display 366 may provide a touch screen interface which allows input to supplement or replace the communication of direction information and command selections by the pointing device 361.

The computer system 310 may perform a portion or all of the processing steps of embodiments of the invention in response to the processors 320 executing one or more sequences of one or more instructions contained in a memory, such as the system memory 330. Such instructions may be read into the system memory 330 from another computer readable medium, such as a hard disk 341 or a removable media drive 342. The hard disk 341 may contain one or more datastores and data files used by embodiments of the present invention. Datastore contents and data files may be encrypted to improve security. The processors 320 may also be employed in a multi-processing arrangement to execute the one or more sequences of instructions contained in system memory 330. In alternative embodiments, hard-wired circuitry may be used in place of or in combination with software instructions. Thus, embodiments are not limited to any specific combination of hardware circuitry and software.

As stated above, the computer system 310 may include at least one computer readable medium or memory for holding instructions programmed according to embodiments of the invention and for containing data structures, tables, records, or other data described herein. The term "computer readable medium" as used herein refers to any medium that participates in providing instructions to the processor 320 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 341 or removable media drive 342. Non-limiting examples of volatile media include dynamic memory, such as system memory 330. Non-limiting examples of transmission media include coaxial cables, copper wire, and fiber optics, including the wires that make up the bus 321. Transmission media may also take the form of acoustic or light waves, such as those generated during radio wave and infrared data communications.

The computing environment 300 may further include the computer system 310 operating in a networked environment using logical connections to one or more remote computers, such as remote computer 380. Remote computer 380 may be a personal computer (laptop or desktop), a mobile device, a server, a router, a network PC, a peer device or other common network node, and typically includes many or all of the elements described above relative to computer system 310. When used in a networking environment, computer system 310 may include modem 372 for establishing communications over a network 371, such as the Internet. Modem 372 may be connected to bus 321 via user network interface 370, or via another appropriate mechanism.

Network 371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 310 and other computers (e.g., remote computer 380). The network 371 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 371.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for ranking design parameter significance, the method comprising:
   receiving, by a computer, an input dataset representative of a physical object, wherein the input dataset comprises a plurality of baseline parameters and a probability for each of the plurality of baseline parameters;
   receiving, by the computer, one or more performance requirements;
   for each respective baseline parameter included in the plurality of baseline parameters, using the computer to perform an analysis process comprising:
      selecting a range of parameter values for the respective baseline parameter based on its corresponding probability distribution,
      segmenting the range of parameter values into a plurality of parameter subsets based a pre-determined granularity for the respective parameter,
      running a plurality of instances of a simulation using the one or more performance requirements to yield a plurality of snapshots, wherein each respective instance corresponds to one of the plurality of parameter subsets,
      deriving a Proper Orthogonal Decomposition (POD) basis using the plurality of snapshots,
      performing a sensitivity analysis based on the POD basis to yield a sensitivity measurement representative of an effect of variation of the respective parameter on the one or more performance requirements; and
   generating, by the computer, a ranking of the plurality of baseline parameters according to their corresponding sensitivity measurements.

2. The method of claim 1, wherein the input dataset comprises a geometry dataset representative of the physical object.

3. The method of claim 2, wherein the geometry dataset comprises a Computer Aided Design (CAD) dataset.

4. The method of claim 2, wherein the input dataset comprises one or more non-geometric datasets related to the physical object.

5. The method of claim 2, wherein the geometry dataset comprises a realization of the physical object and the probability distribution for each parameter is determined based on an analysis of one or more pre-existing alternative realizations of the physical object.

6. The method of claim 1, wherein the probability distribution for each parameter is defined a priori based on one or more characteristics of the plurality of baseline parameters.

7. The method of claim 1, further comprising:
   applying a threshold to the ranking of the plurality of baseline parameters to identify a plurality of highest ranking parameters.

8. The method of claim 1, wherein the plurality of parameter subsets for each respective baseline parameter are sized according to the pre-determined granularity for the respective parameter.

9. The method of claim 8, further comprising:
   determining an extent of deviation of the respective parameter from its corresponding baseline parameter value; and
   if the extent of deviation is greater than a predetermined threshold value, reducing the pre-determined granularity for the respective parameter and repeating the analysis process for the respective parameter.

10. The method of claim 1, wherein the plurality of instances of the simulation are executed in parallel during the analysis process using a parallel computing architecture.

11. An article of manufacture for ranking design parameter significance, the article of manufacture comprising a non-transitory, tangible computer-readable medium holding computer-executable instructions for performing a method comprising:
   determining a probability for each of a plurality of baseline parameters included in an input dataset representative of a physical object;
   for each respective baseline parameter included in the plurality of baseline parameters, performing an analysis process comprising:
      selecting a range of parameter values for the respective baseline parameter based on its corresponding probability distribution,
      segmenting the range of parameter values into a plurality of parameter subsets based a pre-determined granularity for the respective parameter,
      running a plurality of instances of a simulation using one or more performance requirements associated with the physical object to yield a plurality of snapshots, wherein each respective instance corresponds to one of the plurality of parameter subsets,
      deriving a Proper Orthogonal Decomposition (POD) basis on the plurality of snapshots,
      performing a sensitivity analysis based on the POD basis to yield a sensitivity measurement representative of an effect of variation of the respective parameter on the one or more performance requirements; and
   generating a ranking of the plurality of baseline parameters according to their corresponding sensitivity measurements.

12. The article of manufacture of claim 11, wherein the input dataset comprises a geometry dataset representative of the physical object.

13. The article of manufacture of claim 12, wherein the input dataset comprises one or more non-geometric datasets related to the physical object.

14. The article of manufacture of claim 12, wherein the geometry dataset comprises a realization of the physical object and the probability distribution for each parameter is determined based on an analysis of one or more pre-existing alternative realizations of the physical object.

15. The article of manufacture of claim 11, wherein the method further comprises:
defining the probability distribution for each parameter a priori based on one or more characteristics of the plurality of baseline parameters.

16. The article of manufacture of claim 11, wherein the method further comprises:
applying a threshold to the ranking of the plurality of baseline parameters to identify a plurality of highest ranking parameters.

17. The article of manufacture of claim 11, wherein the plurality of parameter subsets for each respective baseline parameter are sized according to the pre-determined granularity for the respective parameter.

18. The article of manufacture of claim 17, wherein the method further comprises
determining an extent of deviation of the respective parameter from its corresponding baseline parameter value; and
if the extent of deviation is greater than a predetermined threshold value, reducing the pre-determined granularity for the respective parameter and repeating the analysis process for the respective parameter.

19. A system for ranking design parameter significance, the system comprising:
an input module configured to:
determine a probability for each of a plurality of baseline parameters included in an input dataset representative of a physical object;
a simulation module configured to perform an analysis process for each respective baseline parameter included in the plurality of baseline parameters, wherein the analysis process comprises:
selecting a range of parameter values for the respective baseline parameter based on its corresponding probability distribution,
segmenting the range of parameter values into a plurality of parameter subsets based a pre-determined granularity for the respective parameter,
running a plurality of instances of a simulation using one or more performance requirements associated with the physical object to yield a plurality of snapshots, wherein each respective instance corresponds to one of the plurality of parameter subsets;
a model reduction module configured to derive a POD basis using snapshots generated by the simulation module;
a sensitivity module configured to perform a sensitivity analysis based on the POD basis to yield a sensitivity measurement for each respective baseline parameter included in the plurality of baseline parameters, wherein each respective sensitivity measurement is representative of an effect of variation of the respective baseline parameter on the one or more performance requirements; and
a ranking module configured to generate a ranking of the plurality of baseline parameters according to their corresponding sensitivity measurements.

20. The system of claim 19, further comprising:
a parallel computing architecture comprising a plurality of processors configured to execute the plurality of instances of the simulation in parallel.

* * * * *